United States Patent
Yokonuma

(10) Patent No.: US 7,590,346 B2
(45) Date of Patent: Sep. 15, 2009

(54) DIGITAL CAMERA

(75) Inventor: Norikazu Yokonuma, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/213,521

(22) Filed: Jun. 20, 2008

(65) Prior Publication Data

US 2008/0267605 A1    Oct. 30, 2008

Related U.S. Application Data

(63) Continuation of application No. 11/285,186, filed on Nov. 23, 2005, now abandoned.

(30) Foreign Application Priority Data

Nov. 29, 2004 (JP) .............................. 2004-343539

(51) Int. Cl.
*G03B 7/00* (2006.01)
*H04N 5/235* (2006.01)
*H04N 5/238* (2006.01)

(52) U.S. Cl. ..................... 396/213; 348/362; 348/364

(58) Field of Classification Search ................. 396/213, 396/233, 234; 348/216.1, 217.1, 222.1, 229.1, 348/362–367, 603, 372, 673, 378, 387

See application file for complete search history.

(56) References Cited

U.S. PATENT DOCUMENTS 6,486,915 B2    11/2002   Bell et al.
2001/0043279 A1 *  11/2001   Niikawa et al. ............. 348/335

FOREIGN PATENT DOCUMENTS

| JP | 04-037826 | 2/1992 |
|---|---|---|
| JP | A-7-38801 | 2/1995 |
| JP | A-2000-92379 | 3/2000 |
| JP | A-2001-0043279 | 11/2001 |
| JP | 2002-223387 | 8/2002 |
| JP | A-2002-268116 | 9/2002 |
| JP | A-2003-158673 | 5/2003 |

* cited by examiner

*Primary Examiner*—Rodney E Fuller
(74) *Attorney, Agent, or Firm*—Oliff & Berridge, PLC

(57) ABSTRACT

A digital camera includes: an image sensor that captures an image of a subject and outputs an image signal; and a control device that engages the image sensor to capture an image at an exposure value having been set, makes a decision as to whether or not an overflow or an underflow deviating from a dynamic range of the image sensor manifests, calculates an exposure correction quantity with which the exposure value having been set is to be corrected in order to reduce the overflow or the underflow based upon results of the decision and engages the image sensor to capture a new image at an exposure value having been corrected in correspondence to the exposure correction quantity.

19 Claims, 7 Drawing Sheets

DIGITAL CAMERA

INCORPORATION BY REFERENCE

This is a Continuation of application Ser. No. 11/285,186 filed Nov. 23, 2005, now abandoned. The entire disclosure of the prior application is hereby incorporated by reference herein in its entirety.

The disclosure of the following priority application is herein incorporated by reference: Japanese Patent Application No. 2004-343539 filed Nov. 29, 2004.

BACKGROUND OF THE INVENTION

1. Field of the Invention

The present invention relates to a digital camera capable of producing images less likely to include white areas or black areas attributable to over-exposure or under-exposure.

2. Description of Related Art

In a digital still camera, a subject light flux having been transmitted through a photographic lens is received at an image sensor such as a CCD, the received light flux undergoes photoelectric conversion, an image is obtained based upon the output resulting from the photoelectric conversion, and the image signal then undergoes various corrections and is finally recorded into an image recording medium such as a memory card. The digital still camera may include a liquid crystal monitor at which images can be displayed, and in such a digital still camera, the monitor can be used as a viewfinder by sequentially updating the display at the liquid crystal monitor with continuously captured images. In addition, the digital still camera may be capable of displaying at the monitor a graph indicating the brightness frequency distribution in an image, i.e., a histogram (see, for instance, Japanese Laid Open Patent Publication No. H7-38801).

SUMMARY OF THE INVENTION

Before capturing an image, exposure values (an aperture value and/or a shutter speed) are set in the camera so as to photograph the main subject with the optimal exposure. However, when photographing a scene in which there is a significant difference between the brightness of the main subject and the brightness of the background, the brightness in the background area may deviate from the dynamic range of the image sensor, resulting in the appearance of white areas due to over-exposure or black areas due to under-exposure. While the appearance of such areas can be reduced by the photographer by performing exposure correction, the photographer needs to have a great deal of experience to be able to select the optimal exposure correction quantity. While the photographer is able to set the exposure correction quantity by checking the histogram on a camera capable of providing real-time display of the histogram, such an exposure correction operation is complicated and novice users are likely to find it unsatisfactory.

According to the 1st aspect of the invention, a digital camera comprises: an image sensor that captures an image of a subject and outputs an image signal; and a control device that engages the image sensor to capture an image at an exposure value having been set, makes a decision as to whether or not an overflow or an underflow deviating from a dynamic range of the image sensor manifests, calculates an exposure correction quantity with which the exposure value having been set is to be corrected in order to reduce the overflow or the underflow based upon results of the decision and engages the image sensor to capture a new image at an exposure value having been corrected in correspondence to the exposure correction quantity.

According to the 2nd aspect of the invention, in the digital camera according to the 1st aspect, it is preferred that the control device makes a decision as to whether or not an overflow or an underflow manifests and calculates the exposure correction quantity based upon the results of the decision by using an image signal of an image captured before an operation with an image-capturing button, and engages the image sensor to capture a new image at the corrected exposure value in response to a shutter release operation.

According to the 3rd aspect of the invention, in the digital camera according to the 2nd aspect, it is preferred that the control device makes a decision as to whether or not an overflow or an underflow manifests and calculates the exposure correction quantity based upon the results of the decision in response to a photographing preparation start operation performed prior to the shutter release operation.

According to the 4th aspect of the invention, in the digital camera according to the 3rd aspect, it is preferred that if the shutter release operation is performed immediately following the photographing preparation start operation, the control device engages the image sensor to capture an image at an initial exposure value having been set without making a decision as to whether or not an overflow or an underflow manifests and calculating the exposure correction quantity based upon the results of the decision.

According to the 5th aspect of the invention, in the digital camera according to the 1st aspect, it is preferred that the control device ascertains an overflow frequency count and an underflow frequency count, determines a direction for exposure correction based upon the overflow frequency count and the underflow frequency count having been ascertained and determines the exposure correction quantity by taking into consideration the direction.

According to the 6th aspect of the invention, in the digital camera according to the 5th aspect, it is preferred that the control device sets a plurality of exposure correction quantities as candidates in correspondence to the direction for the exposure correction having been determined, corrects the exposure value having been set individually in correspondence to each of the plurality of exposure correction quantities having been set as the candidates, engages the image sensor to capture a plurality of images each at one of a plurality of exposure values resulting from correction, selects an optimal exposure correction quantity among the candidates by analyzing a plurality of image signals each corresponding to one of the plurality of images having been captured and engages the image sensor to capture a new image at an exposure value corrected in correspondence to the optimal exposure correction quantity.

According to the 7th aspect of the invention, in the digital camera according to the 6th aspect, it is preferred that the control device engages the image sensor to capture the plurality of images in succession, stores an image signal each time an image is captured, and analyzes the plurality of image signals having been stored and selects the optimal exposure correction quantity after the plurality of images have been captured.

According to the 8th aspect of the invention, in the digital camera according to the 1st aspect, it is preferred that the control device ascertains a brightness frequency distribution in the image signal based upon the image signal and makes a decision based upon the brightness frequency distribution having been ascertained as to whether or not an overflow or an underflow deviating from the dynamic range of the image sensor manifests.

According to the 9th aspect of the invention, in the digital camera according to the 2nd aspect, it is preferred that the control device records into a recording medium image data based upon a signal output from the image sensor in response to the shutter release operation.

According to the 10th aspect of the invention, in the digital camera according to the 2nd aspect, it is preferred that the shutter release operation is performed by fully pressing down on a shutter release button.

According to the 11th aspect of the invention, in the digital camera according to the 3rd aspect, it is preferred that the photographing preparation start operation is performed by pressing a shutter release button halfway down.

According to the 12th aspect of the invention, in the digital camera according to the 1st aspect, it is preferred that the image sensor is constituted with a plurality of pixels and outputs a plurality of signals each corresponding to one of the pixels as the image signal.

According to the 13th aspect of the invention, in the digital camera according to the 1st aspect, it is preferred that the overflow is a signal that causes white clipping in an image and the underflow is a signal that causes black clipping in an image.

According to the 14th aspect of the invention, a digital camera comprises: an image sensor that is constituted with a plurality of pixels, captures an image of a subject and outputs a plurality of signals each corresponding to one of the pixels; and a control device that controls an image-capturing operation at the image sensor. And the control device controls the image sensor so as to capture a subject image at an exposure value having been set, counts a number of signals indicating values exceeding a predetermined upper limit value and a number of signals indicating values under a predetermined lower limit value among the plurality of signals output by capturing an image at the exposure value having been set, corrects the exposure value having been set based upon the number of signals indicating values exceeding the predetermined upper limit value and the number of signals indicating values under the predetermined lower limit value having been counted and controls the image sensor so as to capture a subject image at the corrected exposure value.

According to the 15th aspect of the invention, in the digital camera according to the 14th aspect, it is preferred that the control device corrects the exposure value having been set toward an under-exposure side if signals with values exceeding the predetermined upper limit alone have been counted or the number of signals indicating values exceeding the predetermined upper limit value is greater than the number of signals indicating values under the predetermined lower limit value, and corrects the exposure value having been set toward an over-exposure side if signals with values under the predetermined lower limit value alone have been counted or the number of signals indicating values under the predetermined lower limit value is greater than the number of signals indicating values exceeding the predetermined upper limit value.

According to the 16th aspect of the invention, in the digital camera according to the 14th aspect, it is preferred that the control device determines a direction for exposure correction with regard to the exposure value having been set based upon the number of signals indicating values exceeding the predetermined upper limit value and the number of signals indicating values under the predetermined lower limit value having been counted, selects a plurality of correction values along the direction for exposure correction having been determined, corrects the exposure value having been set individually by using each of the plurality of correction values having been selected, controls the image sensor so as to capture subject images each at one of a plurality of corrected exposure values, determines an optimal corrected exposure value among the plurality of corrected exposure values by analyzing a plurality of signal sets each output as an image is captured at one of the plurality of corrected exposure values, and controls the image sensor so as to capture a subject image at the optimal corrected exposure value having been determined.

According to the 17th aspect of the invention, in the digital camera according to the 16th aspect, it is preferred that the control device counts signals indicating values exceeding the predetermined upper limit value and signals indicating values under the predetermined lower limit value among the plurality of signals output as an image is captured in correspondence to each of the plurality of signal sets, and determines the optimal corrected exposure value corresponding to a signal set with a smallest number of signals indicating values exceeding the predetermined upper limit value or a smallest number of signals indicating values under the predetermined lower limit value.

According to the 18th aspect of the invention, in the digital camera according to the 14th aspect, it is preferred that: there is further provided a recording device that records into a recording medium image data based upon a plurality of signals output by the image sensor; and the control device records into the recording medium image data based upon a plurality of signals output by capturing a subject image at the corrected exposure value without recording into the recording medium image data based upon a plurality of signals output as the image is captured at the exposure value having been set.

According to the 19th aspect of the invention, in the digital camera according to the 16th aspect, it is preferred that: there is further provided a recording device that records into a recording medium image data based upon a plurality of signals output by the image sensor; and the control device records into the recording medium image data based upon a plurality of signals output as a subject image is captured at the optimal corrected exposure value having been determined without recording into the recording medium image data based upon a plurality of signals output by capturing an image at the exposure value having been set or a plurality of sets of image data corresponding to the plurality of signal sets each output as an image is captured at one of the plurality of corrected exposure values.

DESCRIPTION OF PREFERRED EMBODIMENT

In reference to FIGS. 1 to 7, an embodiment of the present invention is explained.

Figure 1:
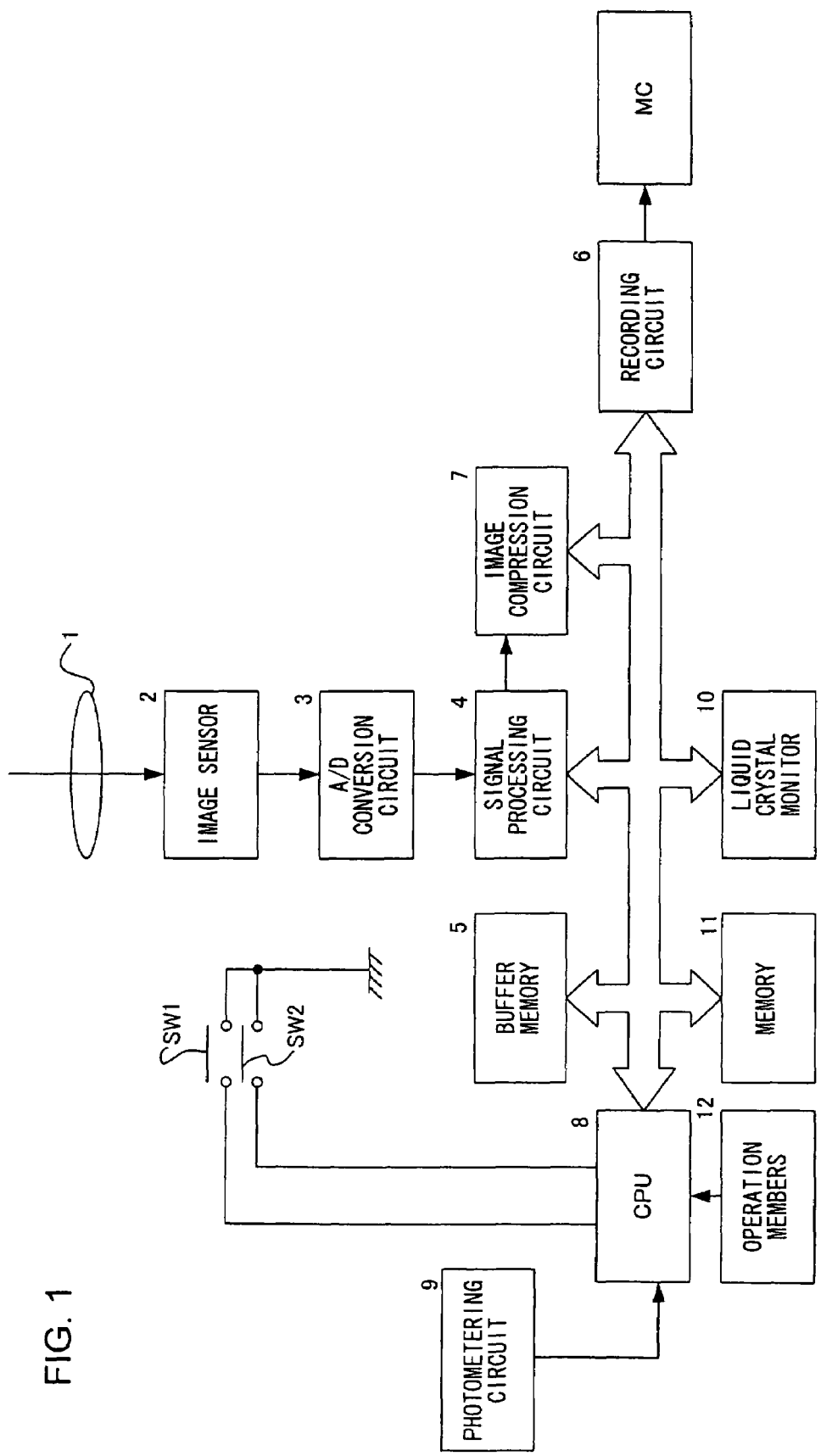
FIG. 1 is a control block diagram related to the camera achieved in an embodiment of the present invention.

FIG. 1 is a block diagram of the digital still camera according to the present invention. An image is formed at the light receiving surface of an image sensor (an image-capturing element or device) 2 constituted with a plurality of pixels, such as a CCD, with a subject light flux having been transmitted through a photographic lens 1. The image sensor 2 captures the image and outputs an image signal (electrical signal) constituted with a plurality of pixel signals each corresponding to one of the plurality of pixels and indicating the intensity of the light in the subject image having been formed. The image signal, constituted with the plurality of pixel signals, may be otherwise referred to as a signal set. The image signal is converted to a digital signal at an A/D converter 3, the digital signal then undergoes various types of image processing at a signal processing circuit 4 and thus, image data are generated. The image data are temporarily stored into a buffer memory 5 and are recorded into a memory card MC via a recording circuit 6. The image data may be compressed in a predetermined compression format at an image compression circuit 7 as necessary before they are recorded. The individual circuits described above are controlled by a CPU 8.

The photographic field is photometered by a photometering circuit 9 and the results of the photometering operation are input to the CPU 8 before an image is captured. The CPU 8 executes an exposure calculation based upon the photometering results, the ISO sensitivity level and the like and thus determines exposure values (an aperture value and a shutter speed) that will allow the subject to be photographed with the optimal exposure. Once the exposure values are determined, the aperture (not shown) is adjusted based upon the aperture value and the image is captured over an exposure period the length of which corresponds to the shutter speed. At a liquid crystal monitor 10, which includes a liquid crystal screen, a liquid crystal drive unit, a backlight, a backlight control unit and the like, an image is displayed based upon image data or other types of information are displayed at the screen thereof.

A halfway press switch SW1 that comes on in response to a halfway press operation (photographing preparation start operation) of a shutter release button, a shutter release switch SW2 that comes on in response to a full press operation (a shutter release operation) of the shutter release button, other operation members 12 and a memory 11 constituted with a ROM, a RAM and the like for storing information needed for executing control are connected to the CPU 8. The full press operation (shutter release operation) of the shutter release button, which constitutes an instruction for an actual image-capturing (photographing) operation and also constitutes an instruction for recording the image data obtained through the image-capturing operation into the memory card MC or the like, may be otherwise referred to as an image-capturing instruction operation or an image data recording instruction operation. Likewise, the shutter release button may be referred to as an image-capturing instruction button or an image data recording instruction button.

As the power to the camera structured as described above is turned on, the photometering operation, the exposure calculation and the image-capturing operation described above are repeatedly executed and images each obtained through a single cycle of operations are successively displayed at a liquid crystal monitor 10. The display mode in which images successively captured are sequentially displayed, thereby constantly updating the display is referred to as a through image display mode. In this mode, the photographer is able to decide on the image composition by checking the through images. It is to be noted that through images are not recorded into the memory card MC.

The automatic exposure correction control, which is the feature that characterizes the embodiment, is now explained. As the shutter release button is pressed halfway down (SW1 ON) in the state described above, the CPU 8 determines an exposure correction quantity based upon which the extent of the appearance of white areas due to over-exposure or black areas due to under-exposure is to be reduced while continuously displaying through images. More specifically, it obtains a through image brightness (or luminance) frequency distribution (histogram) and, based upon the distribution, it determines whether or not an overflow or an underflow manifests, i.e., whether or not there are any pixel signals deviating from the dynamic range of the image sensor 2 toward the over-exposure side or the under-exposure side. Since an overflow will result in the appearance of white areas (white-clipping or white saturation) and an underflow will result in the appearance of black areas (black-clipping or black saturation), the exposure will need to be corrected toward the under-exposure side in order to reduce the appearance of white areas if an overflow manifests, whereas the exposure will need to be corrected toward the over-exposure side in order to reduce the appearance of black areas if an underflow manifests.

Accordingly, if an overflow or an underflow is detected, an image is captured a plurality of times by correcting the initial exposure value to varying extents, brightness frequency distributions are obtained each based upon a given set of image-capturing results (each image) and the exposure correction quantity having been set for the image with the least overflow or underflow frequency count is extracted in the embodiment. If there is a plurality of images with the least overflow frequency count, the exposure correction quantity with the smallest absolute value is extracted, so as to stay as close as possible to the initial exposure value while reducing the extent of the appearance of white areas due to over-exposure or black areas due to under-exposure. The initial exposure value is corrected based upon the exposure correction quantity thus extracted and the exposure value is reset. Subsequently, in response to a shutter release operation (SW2 ON), an image-capturing operation is executed at the adjusted exposure value and the resulting image data are recorded into the memory card MC.

Through the automatic exposure correction control described above, an image manifesting a lower extent of appearance of white areas due to over-exposure or black areas due to under-exposure is ultimately recorded. In addition, since the camera automatically decides whether to execute white area due to over-exposure reduction processing or the black area due to under-exposure reduction processing and obtains the optimal exposure correction quantity for either the white area due to over-exposure reduction or black area due to under-exposure reduction, even a novice photographer is likely to be able to produce an optimally exposed photograph simply by performing a photographing operation without having to concern himself with exposure.

Furthermore, since the processing for determining the exposure correction quantity is executed during the halfway press operation, a time lag to elapse between the shutter release operation and the image recording operation is exactly the same as that elapsing during a regular photographing operation, thereby assuring stress-free handling of the camera for the photographer.

As an alternative, a plurality of images may be captured at varying exposure values in response to a shutter release operation and an image manifesting the least extent of appearance of white areas due to over-exposure or black areas due to under-exposure among the plurality of images may be selected and recorded. However, this alternative is not ideal since the time lag to elapse between the shutter release operation and the recording completion is bound to be protracted. In this case, since the photographer cannot take the next picture immediately and thus, he may miss a good photo opportunity.

Figure 2:
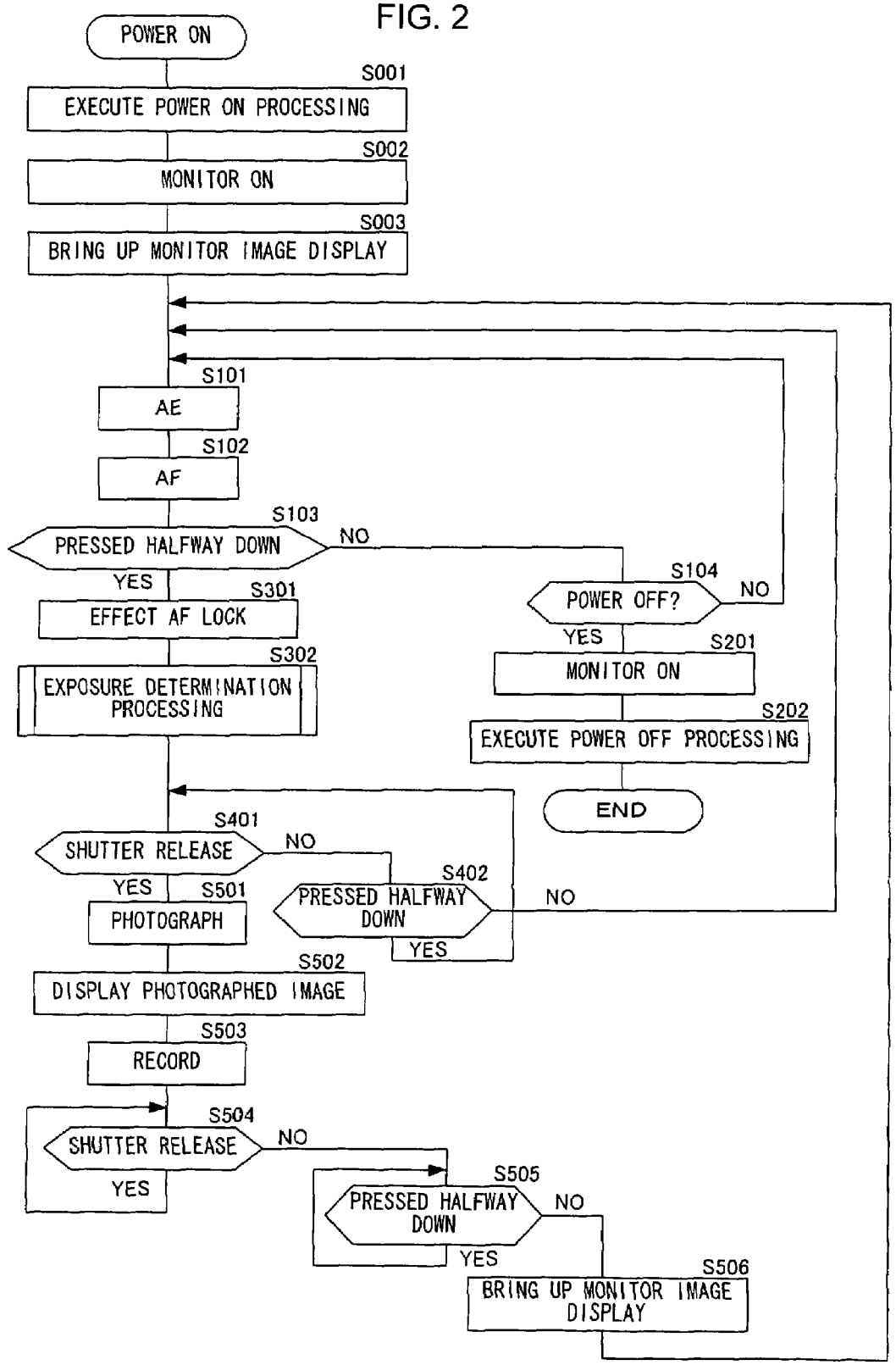
FIG. 2 presents a basic flowchart of camera operations.
Figure 3:
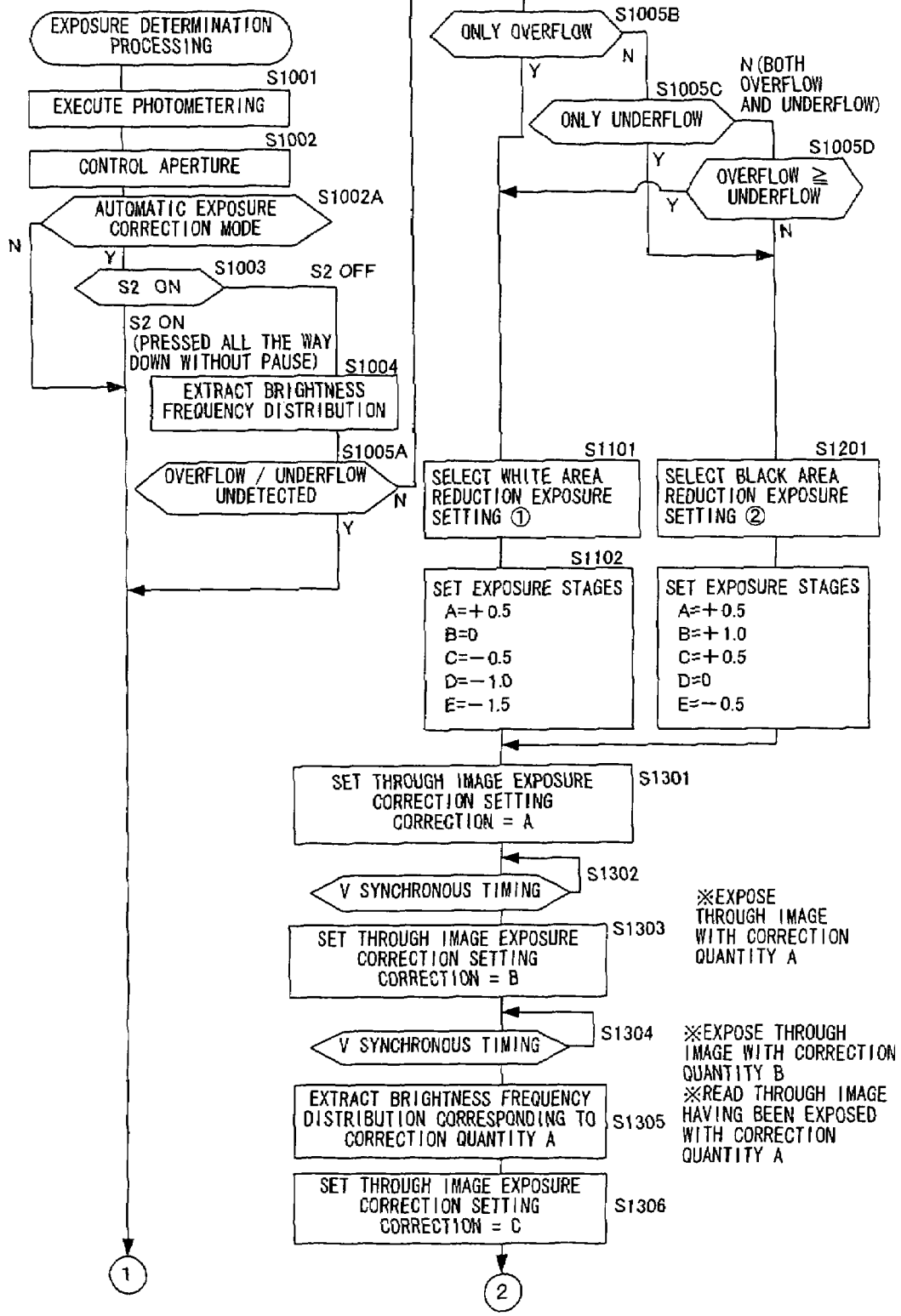
FIG. 3 presents a detailed flowchart of the exposure value determination processing, which includes automatic exposure correction control.
Figure 4:
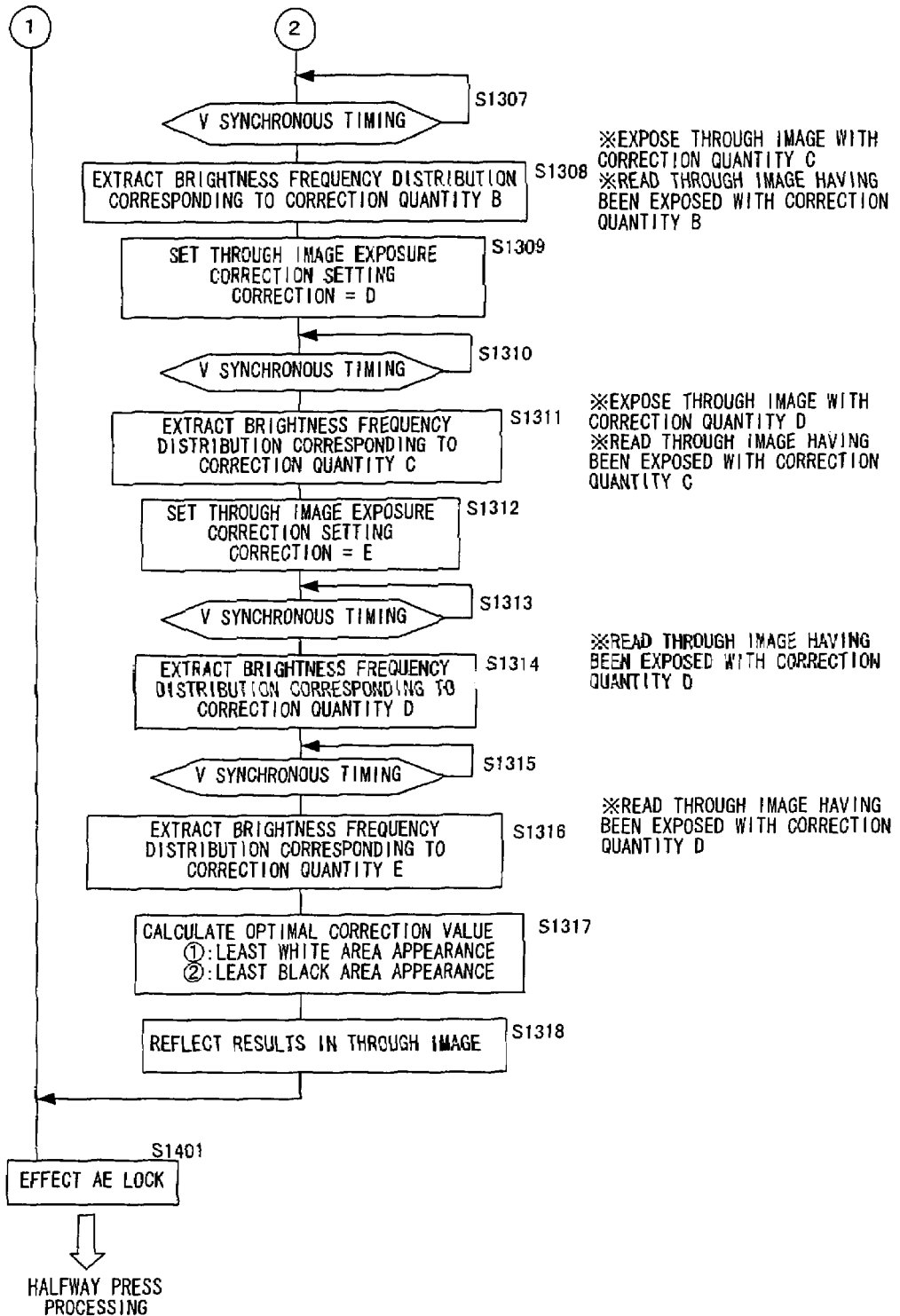
FIG. 4 presents a flowchart in continuation from FIG. 3.

In reference to FIGS. 2 to 4, each showing a processing procedure for executing the control described above in software, the automatic exposure correction operations are explained in further detail.

FIG. 2 shows the basic camera operations executed based upon a program. As the power to the camera is turned on, the program is started up by the CPU 8, and in step S001, power ON processing is executed. As the power ON processing is executed, through-image-capturing, executed over 1/30 sec time intervals, starts. In step S002, the liquid crystal monitor 10 is turned on and in step S003, through image display at the liquid crystal monitor 10 starts.

In step S101, AE processing, constituted with the photometering operation and the exposure calculation explained earlier, is executed and the exposure values are determined. In step S102, AF processing is executed and the photographic lens 1 is driven to the focus match position based upon the results of focal point detection executed by a range finding device (not shown). The processing in steps S101 and S102 is executed repeatedly until it is decided that a halfway press operation has been performed in step S103 or until power OFF is indicated in step S104. Each set of the AF/AE results is reflected in the corresponding through image on the through image display having been initially started in step S003. If it is verified that power OFF has been indicated, the liquid crystal monitor 10 is turned off in step S201 and power OFF processing is executed in step S202 before the processing sequence ends.

If, on the other hand, it is decided in step S103 that a halfway press operation has been performed (SW1 ON), an AF lock is set in step S301 to hold the photographic lens in the focus matched position, and then, exposure determination processing is executed in step S302. The exposure determination processing executed at this time, which includes the automatic setting processing for automatically setting the exposure correction quantity explained earlier, is to be described in detail later.

Following step S302, the operation follows through the loop made up with steps S401 and 402 to wait for a shutter release operation or a halfway press operation clearance. If it is decided that the halfway press operation has been cleared (SW1 OFF), the operation returns to step S101 and the processing described above is repeatedly executed. If, on the other hand, it is decided that a shutter release operation has been performed (SW2 ON), photographing processing is executed in step S501. This photographing processing includes aperture control executed based upon the aperture value having been determined in step S302 and an image-capturing operation executed based upon the shutter speed having been determined in step S302. In step S502, the through image display is cleared, and instead, the image having been obtained in step S501 is brought up on display at the liquid crystal monitor 10. Then, in step S503, the image data are recorded into the memory card MC.

In step S504, the operation waits for the shutter release operation to be cleared and, once the shutter release operation is cleared, it waits for the halfway press operation to be cleared in step S505. Once the halfway press operation is cleared, the monitor display is reset to the through image display mode in step S506 before the operation returns to step S101.

Next, the exposure determination processing executed in step S302 is explained in detail in reference to FIGS. 3 and 4.

In step S1001, the photometering operation and the exposure calculation are executed and the aperture value and the shutter speed are thus determined through the arithmetic operation. These values are stored as the exposure value settings (the aperture value setting and the shutter speed setting). In step S1002, the aperture is controlled based upon the aperture value setting. In this state, an image is captured at the shutter speed having been set, and the resulting image is displayed as a through image.

In step S1002A, a decision is made as to whether or not the camera is currently set in an automatic exposure correction mode. If it is decided that the camera is not currently set in the automatic exposure correction mode, which can be selected/cleared via a specific operation member or via a menu setting screen, the operation proceeds to step S1401 in FIG. 4 to effect an AE lock. In this case, the automatic exposure correction is not executed and the exposure value settings (the values calculated in step S1001) are fixed as the final exposure values. If, on the other hand, it is decided that the camera is currently set in the automatic exposure correction mode, a decision is made in step S1003 as to whether or not a shutter release operation has been performed (SW2 ON/OFF), and the operation proceeds to step S1004 to ascertain the brightness frequency distribution in the through image currently on display if it is decided that no shutter release operation has been performed. Then, based upon the brightness frequency distribution, an overflow frequency count and an underflow frequency count are determined.

In steps S1005A through S1005D, overflow/underflow decision-making processing is executed based upon the brightness frequency distribution ascertained in step S1004. If it is decided in step S1005A that neither an overflow nor an underflow has manifested the operation proceeds to step S1401 to effect an AE lock, since there is no need for exposure correction. In this case, too, the exposure value settings are fixed as the final exposure value.

If an overflow alone is detected, a white area reduction exposure setting mode is selected in step S1101, whereas if an underflow alone is detected, a black area reduction exposure setting mode is selected in step S1201. If both an overflow and an underflow are detected, their frequency counts are compared. The operation proceeds to step S1101 if the overflow count is equal to or greater than the underflow count, but the operation proceeds to step S1201 otherwise.

Namely, through the processing executed in steps S1005A through S1005D, the direction of the correction is determined, i.e., a decision is made whether to correct the exposure toward the over-exposure side or toward the under-exposure side.

In the processing, if an overflow and an underflow manifest to substantially equal extents, the correction priority is given to the reduction of white areas due to over-exposure, since human visual perception characteristics are such that we tend to find white areas due to over-exposure more visually disturbing than black areas due to under-exposure. For this reason, even when the underflow frequency count is greater than the overflow frequency count, the operation may proceed to execute the white area reduction exposure setting mode processing if the overflow frequency count is equal to or greater than a predetermined value. In addition, overflow/underflow manifesting to slight extents may be regarded as no overflow/underflow if they are within allowable ranges.

Once the white area reduction exposure setting mode is set, exposure correction quantities A through E are set in step S1102. The exposure correction quantities A through E are set in stages relative to the exposure value setting so that A=+0.5: B=0: C=−0.5: D=−1.0: E=−1.5. Since the object is to reduce the appearance of white areas due to over-exposure, the correction range is mainly set over the under-exposure side. In this case, the exposure correction quantities C, D and E alone may be set. If, on the other hand, the black area reduction exposure setting mode is selected, exposure correction quantities A through E are set in a similar manner in step S1202. The exposure correction quantities A through E are set so that A=+1.5: B=+1.0: C=+0.5: D=0: E=−0.5 in this mode. Since the object is to reduce the appearance of black areas due to under-exposure, the correction range is mainly set over the over-exposure side. In this case, the exposure correction quantities A, B and C alone may be set.

Subsequently, through the processing executed in steps S1301 through S1316, the exposure correction values A through E are sequentially selected, an image is captured at the exposure value corrected in correspondence to each selected correction quantity and the resulting image is displayed as a through image. The "V synchronization (vertical synchronization)" indicates the length of time (=1/30 sec) of time intervals over which the through images are captured. The exposure correction is executed by adjusting the shutter speed in correspondence to the values A through E while the aperture value remains fixed at the aperture value setting. It is to be noted that the exposure correction may instead be executed by adjusting the aperture value.

Figure 5:
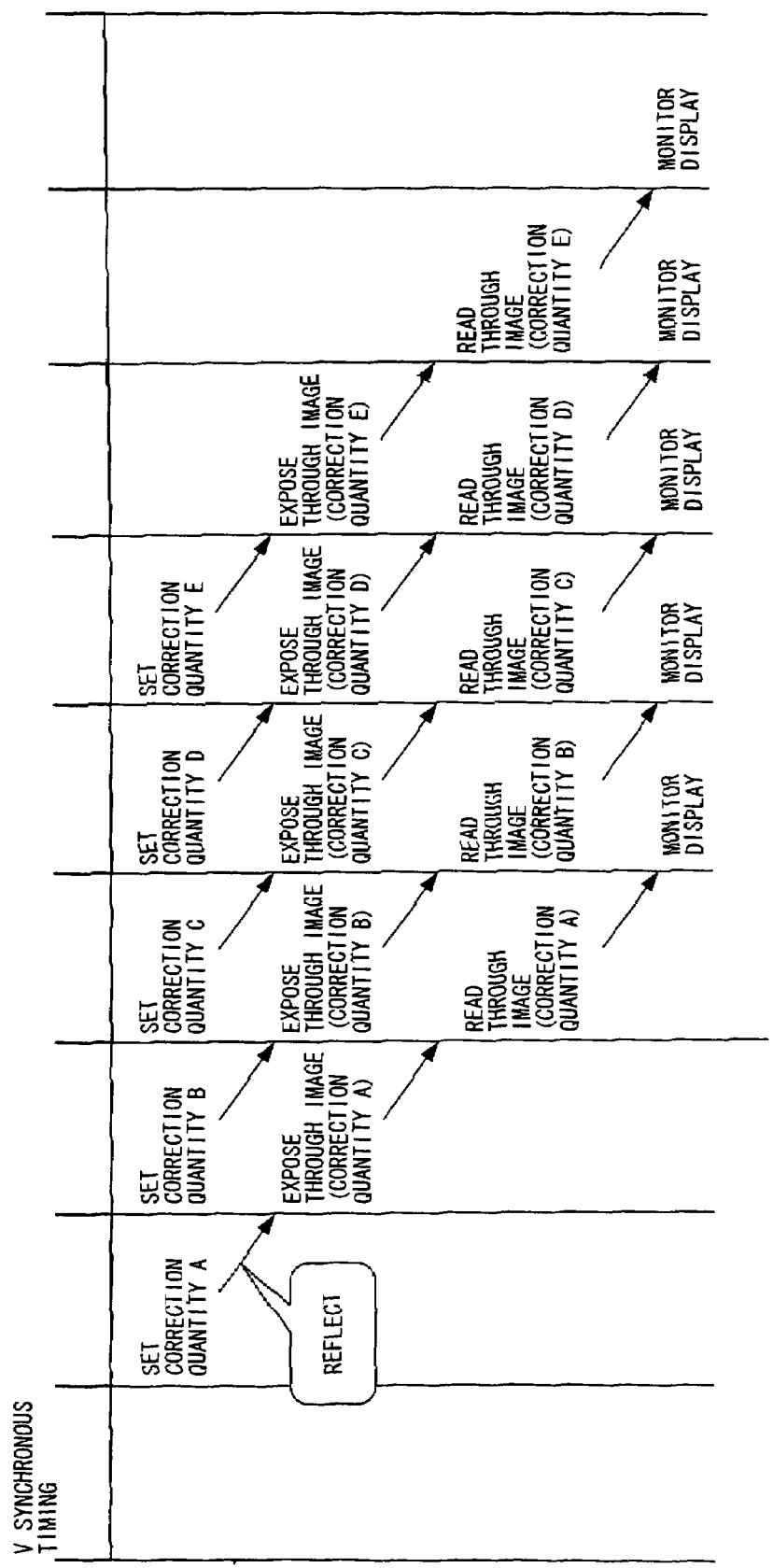
FIG. 5 is a time chart indicating the timing with which individual operations are executed when determining the exposure correction quantity.

FIG. 5 is a time chart of the operations executed through the processing in steps S1301 through S1316. As the first exposure correction quantity A is set, a through image is exposed (captured) at the exposure value corrected based upon the exposure correction quantity A with the subsequent V synchronous timing, and in synchronization with this through image exposure, the next exposure correction quantity B is set. With the next V synchronous timing, the image obtained through the through image exposure (corresponding to the correction quantity A) is read, and in synchronization with the image read, a through image is exposed (in correspondence to the correction quantity B) and the exposure correction quantity C is set. Then, with the next V synchronous timing, the through image having been read is displayed (corresponding to the correction quantity A), the image (corresponding to the correction quantity B) is read, a through image (corresponding to the correction quantity C) is exposed and the exposure correction quantity D is set. Thus, the operations are executed with the V synchronous timing until the last through image (corresponding to the correction quantity E) is displayed, and the brightness frequency distributions are extracted in correspondence to the individual through images (in correspondence to the individual correction quantities A through E).

In step S1317, the five brightness frequency distributions are analyzed and the optimal exposure correction quantity is determined. Namely, if the white area reduction exposure setting mode is currently set, the exposure correction quantity corresponding to the image with the least overflow frequency count among the exposure correction quantities A through E is extracted. If, on the other hand, the black area reduction exposure setting mode is currently set, the exposure correction quantity corresponding to the image with the least underflow frequency count among the exposure correction quantities A through E is extracted. If there is a plurality of images with the least overflow/underflow frequency count, the exposure correction value with the smallest absolute value should be extracted so as to capture an image at an exposure value closer to the exposure value setting. The exposure correction quantity thus extracted is the optimal exposure correction quantity and the exposure value corrected based upon the optimal exposure correction quantity is the final exposure value. In step S1318, a through image captured at the final exposure value is displayed, and in step S1401, the final exposure value is held through the AE lock before the operation makes a return.

The processing described above is executed after a negative decision is made in step S1003. If an affirmative decision is made in step S1003, the operation directly proceeds to step S1401. An affirmative decision made in step S1003 indicates that a shutter release operation has been performed in immediate succession to a halfway press operation, i.e., the halfway press operation has directly shifted into a full press operation without holding the halfway press state. In such a case, it is judged that the photographer wishes to take a photograph immediately and, accordingly, the operation skips the processing in step S1004 and subsequent steps even if the automatic exposure correction mode is currently set. Instead, an AE lock is set to fix the exposure value settings as the final exposure values in preparation for a photographing operation. As a result, the likelihood of catching a good photo opportunity is increased.

Figure 6:
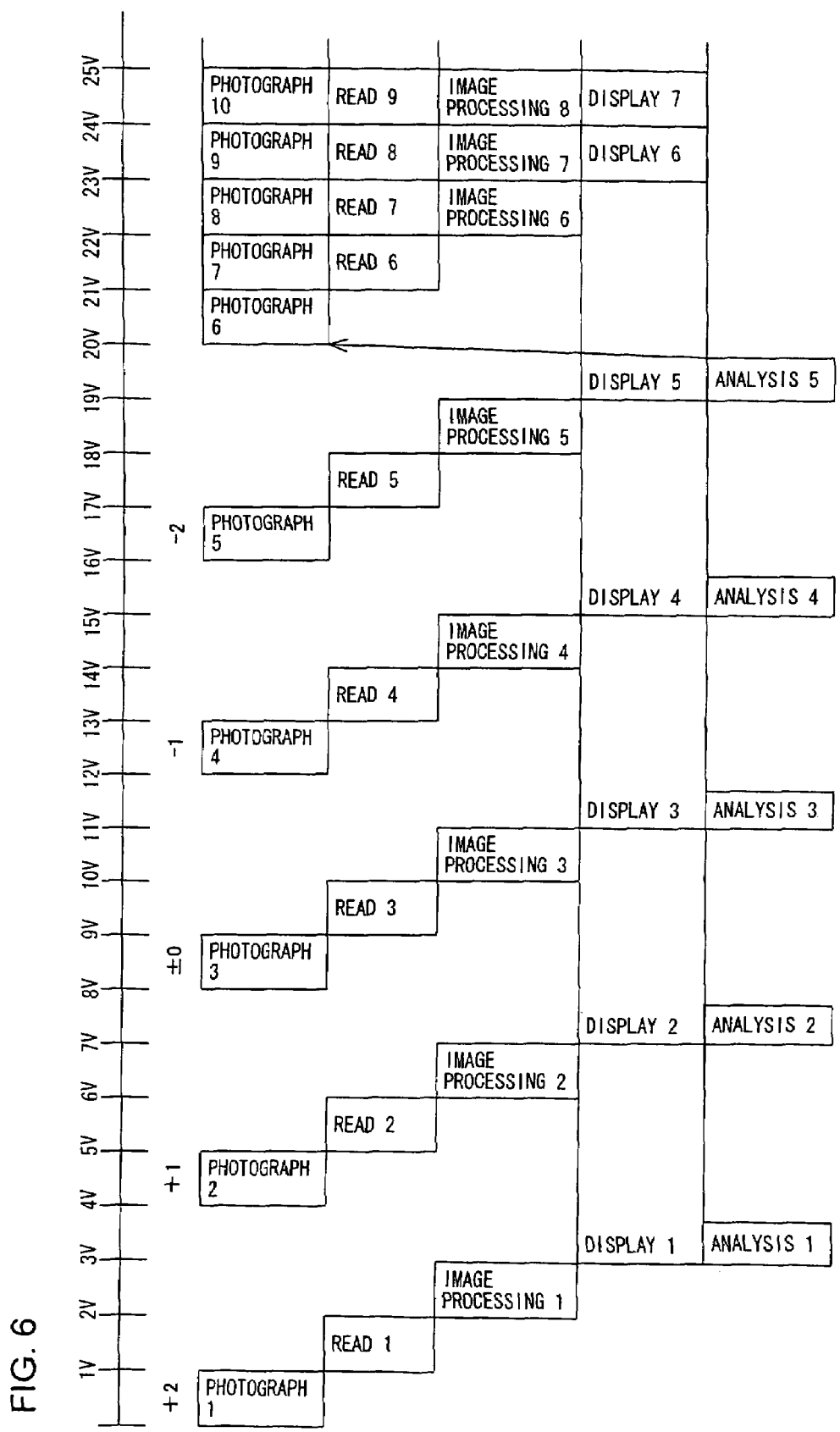
FIG. 6 is a time chart representing an example of the automatic exposure correction processing in which each image is analyzed as it is captured.
Figure 7:
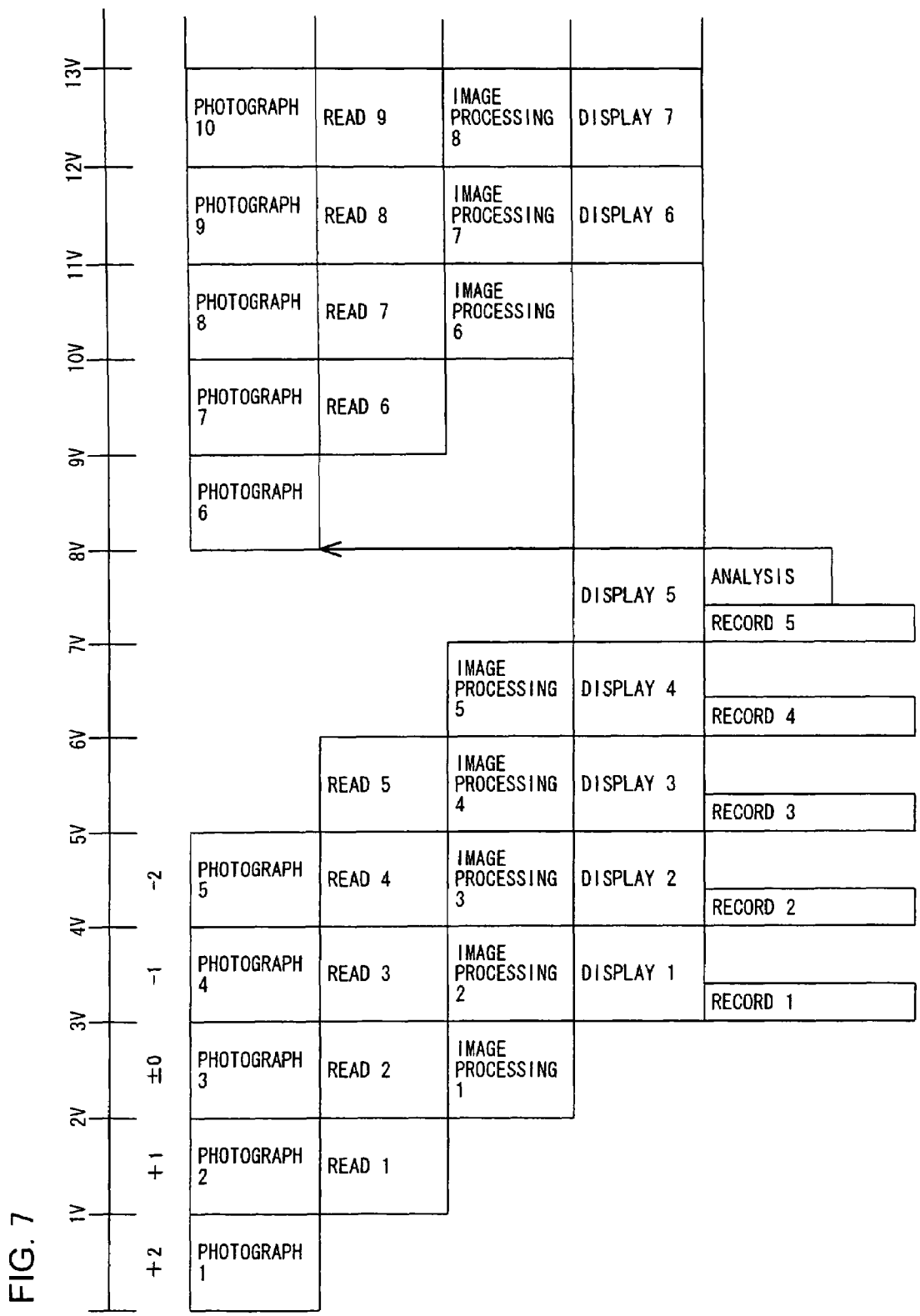
FIG. 7 is a time chart representing another example of the automatic exposure correction processing, in which images are analyzed after all the images are captured.

FIGS. 6 and 7 are time charts of two different methods of automatic exposure correction processing.

In the method shown in FIG. 6, the brightness frequency distribution is analyzed each time an image is captured, and the individual operations, i.e., photographing (image-capturing), image read, image processing, display and analysis, are each executed with V synchronous timing. The numerals attached to the letter V each indicate the number of operations having been executed at the corresponding time point. In this method, the next image is captured after the preceding image has been analyzed, and thus, 20V (V=1/30 sec)=667 ms elapses before analyzing of the fifth image is completed, i.e. before the optimal exposure correction value is determined. However, since images having already been captured do not need to be saved, the buffer memory does not need to have a large capacity.

Higher-speed processing is achieved through the method shown in FIG. 7, by capturing images successively, storing the individual images as they are captured and obtaining and analyzing their brightness frequency distributions after all the images are stored. In this case, the buffer memory needs to have a large enough capacity to save at least five images. However, since each image can be captured without having to wait for the analysis of the preceding image to be completed, the optimal exposure correction value can be determined in 8V=267 ms. Thus, the automatic exposure correction control is executed too fast to be noticed by the photographer.

It is to be noted that while five images are captured to determine the optimal exposure correction quantity in the example explained above, the image-capturing operation does not need to be executed five times. In addition, the processing may be simplified by skipping the image-capturing operations and univocally determining the exposure correction quantity in correspondence to the overflow (or underflow) frequency count. For instance, if the overflow (or underflow) frequency count is less than a predetermined value, the exposure value setting may be used without correction, the exposure value setting may be corrected by −1 stage (or +1 stage) if the frequency count is equal to or greater than a predetermined value within a specific range, and the exposure value setting may be corrected by −2 stage (or +2 stage) if the frequency count is beyond the range. Through this method, too, a certain extent of correction effect is achieved. Furthermore, it is desirable to set certain limits with regard to the optimal exposure correction quantity. If the exposure value setting is corrected by an excessive extent, the areas to be correctly exposed (in particular the main subject) may become greatly under-exposed or greatly over-exposed while the appearance of white areas due to over-exposure or black areas due to under-exposure is reduced.

In addition, while the exposure correction quantity is selected in response to a halfway press operation, they may be obtained in response to a shutter release operation instead. While the shutter release time lag may become protracted in the latter case, the appearance of white areas due to over-exposure or black areas due to under-exposure can be effectively eliminated without the photographer being particularly aware of the process.

An explanation is given above in reference to the embodiment on an example in which the brightness frequency distribution is ascertained and a decision is made as to whether or not an overflow or an underflow manifests, i.e., whether or not there are pixel signals deviating from the dynamic range of the image sensor 2 toward the over-exposure side or the under-exposure side. However, it is not strictly necessary to ascertain the brightness frequency distribution. A decision as to whether or not an overflow or an underflow manifests may be made simply by judging whether or not the image signal corresponding to each pixel indicates a value equal to or greater than a predetermined over-exposure side threshold value (an upper limit value) or judging whether or not the value is equal to or less than a predetermined under-exposure side threshold value (a lower limit value). Then, the overflow frequency count can be determined by counting the image signals with values equal to or greater than the predetermined over-exposure side threshold value (upper limit value) and the underflow frequency count can be determined by counting image signals with values equal to or less than the predetermined under-exposure side threshold value (lower limit value).

While an explanation is given above in reference to the embodiment on an example in which the present invention is adopted in a digital still camera, the present invention is not limited to this example. The present invention may instead be adopted in conjunction with images captured on a camera mounted at a portable telephone. In addition, the present invention may be adopted in conjunction with still images photographed with a video camera or the like. Namely, the present invention may be adopted in all types of apparatuses in which a subject image is captured at an image sensor by setting a specific exposure value. Such cameras and apparatuses that invariably handle digital image signals may be regarded as digital cameras.

The above described embodiment is an example and various modifications can be made without departing from the spirit and scope of the invention.

What is claimed is:

1. A digital camera comprising:
    an image sensor that captures an image of a subject and outputs an image signal; and
    a control device that
        engages the image sensor to capture an image at an exposure value that has been set,
        decides whether or not an overflow or an underflow deviating from a dynamic range of the image sensor has manifested,
        sets a plurality of exposure correction quantities corresponding to the overflow or the underflow when the decision indicates that the overflow or the underflow has manifested,
        engages the image sensor to capture a plurality of images respectively corresponding to the plurality of set exposure correction quantities,
        selects a final exposure correction quantity from the plurality of exposure correction quantities based upon the captured plurality of images, and
        engages the image sensor to capture a new image at a corrected exposure value corresponding to the final exposure correction quantity.

2. A digital camera according to claim 1, wherein:
   the control device
       decides whether or not an overflow or an underflow has manifested,
       calculates an exposure correction quantity based upon the results of the decision by using an image signal of an image captured before an operation with an image-capturing button, and
       engages the image sensor to capture a new image at the corrected exposure value in response to a shutter release operation.

3. A digital camera according to claim 2, wherein:
   the control device calculates the exposure correction quantity based upon the results of the decision in response to a photographing preparation start operation performed prior to the shutter release operation.

4. A digital camera according to claim 3, wherein:
   when the shutter release operation is performed immediately following the photographing preparation start operation, the control device
       engages the image sensor to capture an image at an initial exposure value that has been set without making a decision as to whether or not an overflow or an underflow has manifested, and calculates the exposure correction quantity based upon the results of the decision.

5. A digital camera according to claim 3, wherein:
   the photographing preparation start operation is performed in response to a shutter release button being pressed halfway down.

6. A digital camera according to claim 2, wherein:
   the control device records into a recording medium image data based upon a signal output from the image sensor in response to the shutter release operation.

7. A digital camera according to claim 2, wherein:
   the shutter release operation is performed in response to a shutter release button being fully pressed down.

8. A digital camera according to claim 1, wherein:
   the control device
       ascertains an overflow frequency count and an underflow frequency count,
       determines a direction for exposure correction based upon the ascertained overflow frequency count and the ascertained underflow frequency count, and
       determines the exposure correction quantity by taking into consideration the determined direction.

9. A digital camera according to claim 8, wherein:
   the control device
       sets the plurality of exposure correction quantities as candidates in correspondence to the determined direction for the exposure correction,
       corrects the set exposure value in correspondence to each of the plurality of exposure correction quantities set as the candidates to produce a plurality of corrected exposure values,
       engages the image sensor to capture the plurality of images each at one of the plurality of corrected exposure values, selects an optimal exposure correction quantity from the candidates by analyzing a plurality of image signals each corresponding to one of the captured plurality of images, and engages the image sensor to capture a new image at a corrected exposure value corresponding to the optimal exposure correction quantity.

10. A digital camera according to claim 9, wherein:
the control device
engages the image sensor to capture the plurality of images in succession,
stores an image signal each time an image is captured, and
analyzes the stored plurality of image signals, and selects the optimal exposure correction quantity after the plurality of images have been captured.

11. A digital camera according to claim 1, wherein:
the control device
ascertains a brightness frequency distribution in the image signal based upon the image signal, and
decides, based upon the ascertained brightness frequency distribution, whether or not an overflow or an underflow deviating from the dynamic range of the image sensor has manifested.

12. A digital camera according to claim 1, wherein:
the image sensor is constituted with a plurality of pixels and outputs a plurality of signals each corresponding to one of the pixels as the image signal.

13. A digital camera according to claim 1, wherein:
the overflow is a signal that causes white clipping in an image and the underflow is a signal that causes black clipping in an image.

14. A digital camera comprising:
an image sensor that
is constituted with a plurality of pixels,
captures an image of a subject, and
outputs a plurality of signals each corresponding to one of the pixels; and
a control device that controls an image-capturing operation at the image sensor, wherein:
the control device
controls the image sensor so as to capture a subject image at an exposure value that has been set,
counts a number of signals indicating values exceeding a predetermined upper limit value and a number of signals indicating values under a predetermined lower limit value among the plurality of signals output by capturing the subject image at the set exposure value,
sets a plurality of correction values based upon the counted number of signals indicating values exceeding the predetermined upper limit value and the counted number of signals indicating values under the predetermined lower limit value,
corrects the set exposure value by using each of the set plurality of correction values to produce a plurality of corrected exposure values,
controls the image sensor so as to capture a plurality of subject images each at one of the plurality of corrected exposure values,
determines an optimal corrected exposure value from the plurality of corrected exposure values by analyzing a plurality of signal sets each output as an image is captured at one of the plurality of corrected exposure values, and
controls the image sensor so as to capture a subject image at the optimal corrected exposure value.

15. A digital camera according to claim 14, wherein:
the control device
corrects the set exposure value toward an under-exposure side if signals with values exceeding the predetermined upper limit alone have been counted or the number of signals indicating values exceeding the predetermined upper limit value is greater than the number of signals indicating values under the predetermined lower limit value, and
corrects the set exposure value toward an over-exposure side if signals with values under the predetermined lower limit value alone have been counted or the number of signals indicating values under the predetermined lower limit value is greater than the number of signals indicating values exceeding the predetermined upper limit value.

16. A digital camera according to claim 14, wherein:
the control device
determines a direction for exposure correction with regard to the set exposure value based upon the counted number of signals indicating values exceeding the predetermined upper limit value and the counted number of signals indicating values under the predetermined lower limit value, and
selects the plurality of correction values along the determined direction for exposure correction.

17. A digital camera according to claim 16, wherein:
the control device
counts signals indicating values exceeding the predetermined upper limit value and signals indicating values under the predetermined lower limit value among the plurality of signals output as an image is captured in correspondence to each of the plurality of signal sets, and
determines the optimal corrected exposure value corresponding to a signal set with a smallest number of signals indicating values exceeding the predetermined upper limit value or a smallest number of signals indicating values under the predetermined lower limit value.

18. A digital camera according to claim 16, further comprising:
a recording device that records into a recording medium image data based upon a plurality of signals output by the image sensor, wherein:
the control device records into the recording medium image data based upon a plurality of signals output as a subject image is captured at the determined optimal corrected exposure value without recording into the recording medium image data based upon a plurality of signals output by capturing an image at the set exposure value or a plurality of sets of image data corresponding to the plurality of signal sets each output as an image is captured.

19. A digital camera according to claim 14, further comprising:
a recording device that records into a recording medium image data based upon a plurality of signals output by the image sensor, wherein:
the control device records into the recording medium image data based upon a plurality of signals output by capturing a subject image at the corrected exposure value without recording into the recording medium image data based upon a plurality of signals output as the image is captured at the set exposure value.

* * * * *